April 1, 1924.
R. F. RUNGE
JOURNAL BEARING
Filed Oct. 21, 1922
1,488,712
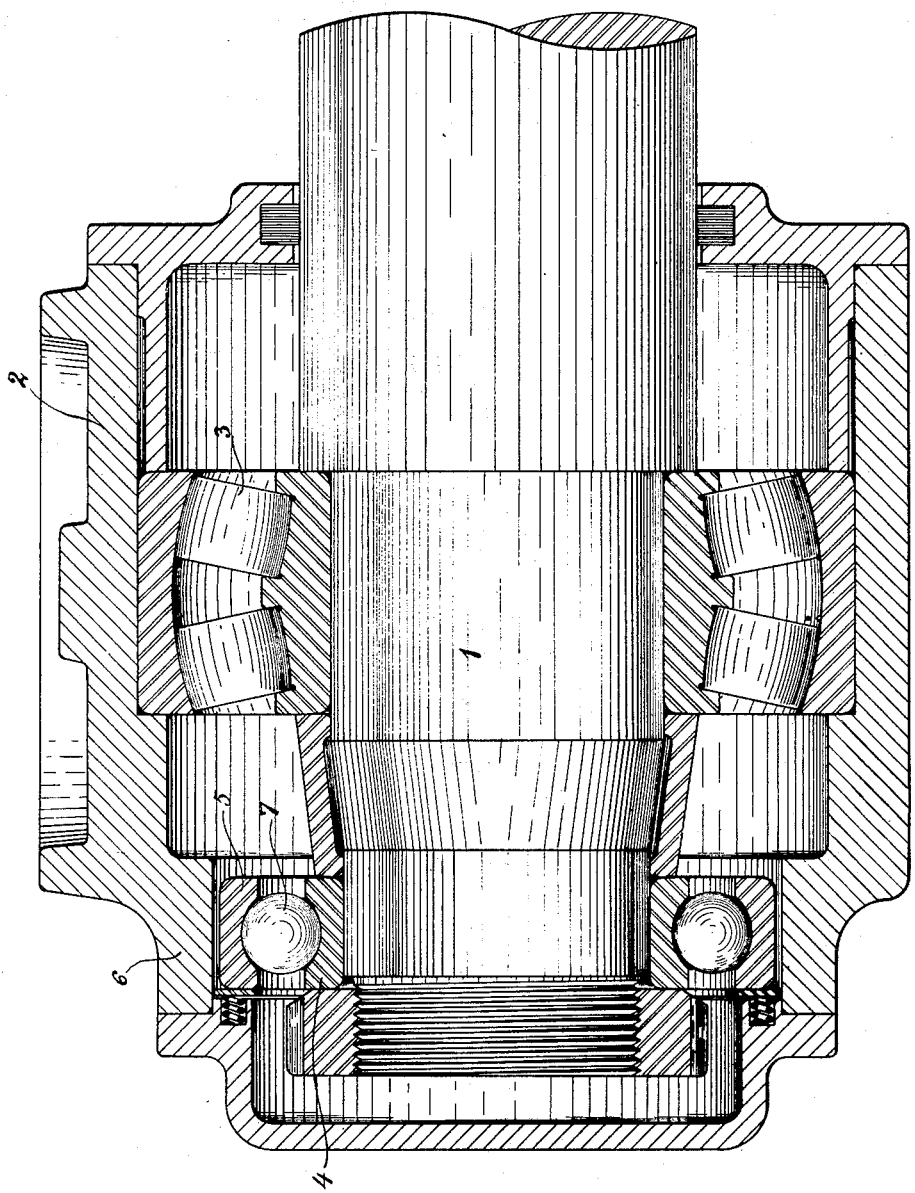

Patented Apr. 1, 1924.

1,488,712

UNITED STATES PATENT OFFICE.

ROBERT F. RUNGE, OF PHILADELPHIA, PENNSYLVANIA, ASSIGNOR TO THE SKAYEF BALL BEARING COMPANY, A CORPORATION OF CONNECTICUT.

JOURNAL BEARING.

Application filed October 21, 1922. Serial No. 595,888.

*To all whom it may concern:*

Be it known that I, ROBERT F. RUNGE, a citizen of the United States, residing at Philadelphia, in the county of Philadelphia and State of Pennsylvania, have invented certain new and useful Improvements in Journal Bearings, of which the following is a specification, reference being had therein to the accompanying drawing.

This invention relates to bearing mountings and more particularly to journal boxes in which the journal is so mounted as to have a certain degree of oscillatory movement, the object of the invention being to provide anti-friction means for limiting such rocking movement. In another aspect, the invention is to provide means for anti-frictionally limiting the amplitude of rocking motion of a machine part mounted on a self-aligning anti-friction bearing, and, during such function of limitation, for sustaining a portion of the radial load. This division of load may be regarded as taken in such manner that the excess or shock load causing, or caused by, the motion of self-alignment is borne by the auxiliary bearing.

In the drawing accompanying this application there is shown in axial section a journal box equipped with a form of my improved bearing mounting.

There is shown a journal portion, 1, of a car axle supported in a journal box, 2, by means of a self-aligning roller bearing, 3, capable of sustaining the radial load transmitted from the journal box to the shaft, and also capable of taking end thrust or axial load. The load carrying bearing, 3, is intended to permit free self-aligning movement between the journal and the journal box.

In a structure of this kind it is highly desirable that the amplitude of oscillation of the box relatively to the journal be limited, and that the force for effecting this limitation be applied in a manner to avoid shocks and the creation of friction. The self-alignment, which it is desired to limit, takes place during the relative rotation of the parts of the structure, consequently my concern as to the avoidance of friction. In the form of invention shown by way of illustration this is provided against by means of an anti-friction bearing carried by one of the parts and normally free of the other, but located in position for engagement therewith upon a predetermined amount of oscillation. In the present illustration this supplementary or oscillation limiting bearing is in the form of a single row deep-groove bearing, the inner ring, 4, of which being mounted fast upon the outer end of the journal. The outer perimeter of the outer ring, 5, is of somewhat smaller diameter than the bore of the surrounding portion, 6, of the journal box.

The particular form of the invention shown in the drawing was designed for use in connection with the journal boxes of railway cars, and to avoid circumlocution the invention will be described in the terms of such art although it is not the intention to limit the invention thereto. Preferably the parts are so constructed and located that the journal box will not engage the outer ring, 5, of this bearing during the slight oscillations which occur in the travel of the car, but are so located that upon the greater oscillations which occur the parts which come into engagement with the ring, 5, can thereby limit the oscillation or rocking in that direction. It might be supposed that the balls, 7, of the limiting bearing and the races, 4 and 5, would be subjected to very severe pounding action, but in most cases, as a matter of fact, the oscillatory movement is very slow indeed and the housing portion surrounding the limiting bearing engages its outer ring by a slow and almost imperceptible movement, which movement, however, would continue but for the interposition of some detaining device which in the illustration is afforded by this anti-friction bearing. In some instances the engagement between the housing and the outer ring of the bearing will be merely that of stabilizing the parts, in others, the tendency to movement which is interrupted will bring a considerable radial load upon this limiting bearing in which case it then supplements the main bearing, 3, in sustaining the radial load.

It is quite obvious that the installation shown herein is an illustration of but one means of carrying my invention into effect, and that various changes may be made in details within the scope of the claims without departing from the spirit of my invention. One quite obvious change would be to select a larger sized limiting bearing and have the perimeter of the outer ring securely fit within the housing, in which instance the bore of the inner ring would have a sufficient predetermined amount of clearance from the outer perimeter of the journal.

I claim as my invention:

1. The combination with a shaft, of a housing therefor, an anti-friction bearing between these parts constructed and adapted to permit relative rotation and oscillation of the same, and an anti-friction bearing carried by one of the said parts and normally out of contact with the other, but located in position to be engaged thereby upon a predetermined oscillatory movement of one of the parts relatively to the other.

2. The combination with a housing, of a shaft therein, a self-aligning combined radial and thrust roller bearing between the housing and the shaft, and a radial roller bearing mounted on the shaft and normally out of engagement with the housing, such latter bearing being constructed and adapted to engage the housing upon a predetermined amount of self-alignment of the shaft within the housing.

3. The combination with a housing, of a shaft therein, a radial roller bearing between these parts, and a radial bearing comprising inner and outer rings and a row of rolling elements between these, one of the rings having a tight fit with one of the said parts, and the other ring normally free of the other of said parts, but located in position to engage the same upon the relative oscillation of such parts.

4. The combination with a journal, of a housing therefor, a self-aligning radial anti-friction bearing between these parts, and an anti-friction bearing carried by one of the said parts and normally out of contact with the other, and located in position to limit the oscillatory movement of one of the parts relatively to the other.

5. A structure as called for in claim 4, wherein the limiting bearing is constructed and adapted when functioning to sustain a portion of the radial load.

In testimony whereof, I have affixed my signature hereto.

ROBERT F. RUNGE.